United States Patent
Morikawa et al.

(10) Patent No.: US 9,413,013 B2
(45) Date of Patent: Aug. 9, 2016

(54) NON-AQUEOUS ELECTROLYTE SECONDARY BATTERY AND METHOD FOR PRODUCING THE SAME

(75) Inventors: Takaharu Morikawa, Osaka (JP); Yasushi Nakagiri, Tokushima (JP); Masaki Deguchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 463 days.

(21) Appl. No.: 13/996,914

(22) PCT Filed: Oct. 26, 2011

(86) PCT No.: PCT/JP2011/005977
§ 371 (c)(1),
(2), (4) Date: Jun. 21, 2013

(87) PCT Pub. No.: WO2012/090368
PCT Pub. Date: Jul. 5, 2012

(65) Prior Publication Data
US 2013/0288085 A1  Oct. 31, 2013

(30) Foreign Application Priority Data
Dec. 28, 2010  (JP) ................. 2010-291924

(51) Int. Cl.
*H01M 2/00*  (2006.01)
*H01M 4/62*  (2006.01)
(Continued)

(52) U.S. Cl.
CPC .............. *H01M 4/628* (2013.01); *H01M 4/131* (2013.01); *H01M 4/1391* (2013.01);
(Continued)

(58) Field of Classification Search
CPC  H01M 10/0569; H01M 4/131; H01M 4/1391
USPC ......................................... 429/158
See application file for complete search history.

(56) References Cited

U.S. PATENT DOCUMENTS

| 6,365,299 B1 * | 4/2002 | Miyaki ................. H01M 4/131 |
| | | 429/131 |
| 2001/0038949 A1 | 11/2001 | Hatazaki et al. |

(Continued)

FOREIGN PATENT DOCUMENTS

| JP | 2001-297790 A | 10/2001 |
| JP | 2005-108513 A | 4/2005 |

(Continued)

OTHER PUBLICATIONS

International Search Report issued in PCT/JP2011/005977, dated Feb. 7, 2012.

*Primary Examiner* — Mark F Huff
*Assistant Examiner* — Monique Wills
(74) *Attorney, Agent, or Firm* — McDermott Will & Emery LLP (57) ABSTRACT

Disclosed is a non-aqueous electrolyte secondary battery including a positive electrode including a lithium-containing transition metal composite oxide as a positive electrode active material, a negative electrode including a negative electrode active material, a separator interposed between the positive electrode and the negative electrode, and a non-aqueous electrolyte. The positive electrode contains lithium carbonate and lithium hydrogencarbonate in a total amount of 500 ppm or more and 3000 ppm or less, and exhibits a weight loss by temperature increase from 25° C. to 300° C. at 5° C./min of 70% or less of the total amount and of 1500 ppm or less. The non-aqueous electrolyte includes a non-aqueous solvent and a lithium salt. The non-aqueous solvent may contain a cyclic carbonate and a chain carbonate.

10 Claims, 1 Drawing Sheet (51) Int. Cl.
*H01M 4/131* (2010.01)
*H01M 4/1391* (2010.01)
*H01M 4/485* (2010.01)
*H01M 4/505* (2010.01)
*H01M 4/525* (2010.01)
*H01M 10/0525* (2010.01)
*H01M 10/0567* (2010.01)
*H01M 10/0569* (2010.01)
*H01M 10/052* (2010.01)

(52) U.S. Cl.
CPC .............. *H01M 4/485* (2013.01); *H01M 4/505* (2013.01); *H01M 4/525* (2013.01); *H01M 10/052* (2013.01); *H01M 10/0525* (2013.01); *H01M 10/0567* (2013.01); *H01M 10/0569* (2013.01); *Y02E 60/122* (2013.01); *Y02P 70/54* (2015.11); *Y02T 10/7011* (2013.01); *Y10T 29/49108* (2015.01)

(56) References Cited

U.S. PATENT DOCUMENTS

| | | | |
|---|---|---|---|
| 2002/0031703 A1* | 3/2002 | Kameyama | H01M 2/0212 429/162 |
| 2008/0254368 A1 | 10/2008 | Ooyama et al. | |
| 2008/0268340 A1 | 10/2008 | Kuwahara et al. | |
| 2009/0305143 A1 | 12/2009 | Matsuno et al. | |
| 2010/0209757 A1 | 8/2010 | Ooyama et al. | |

FOREIGN PATENT DOCUMENTS

| | | |
|---|---|---|
| JP | 2008-186704 A | 8/2008 |
| JP | 2008-251434 A | 10/2008 |
| JP | 2008-277087 A | 11/2008 |
| JP | 2010-192200 A | 9/2010 |
| JP | 2011-060541 A | 3/2011 |
| JP | 2011-181285 A | 9/2011 |
| WO | 2008-139578 A1 | 11/2008 |

* cited by examiner

NON-AQUEOUS ELECTROLYTE SECONDARY BATTERY AND METHOD FOR PRODUCING THE SAME

RELATED APPLICATIONS

This application is the U.S. National Phase under 35 U.S.C. §371 of International Application No. PCT/JP2011/005977, filed on Oct. 26, 2011, which in turn claims the benefit of Japanese Application No. 2010-291924, filed on Dec. 28, 2010, the disclosures of which Applications are incorporated by reference herein.

TECHNICAL FIELD

The present invention relates to a non-aqueous electrolyte secondary battery and a method for producing the same, and specifically relates to an improvement of the positive electrode.

BACKGROUND ART

In recent years, electronic devices are rapidly becoming more portable and cordless. For use as a driving power source for such devices, there is an increasing demand for small-size and light-weight secondary batteries with high energy density. Moreover, characteristics such as high output characteristics, durability over a long period of time, and safety are required not only for small-size secondary batteries for consumer use, but also for large-size secondary batteries for use in power storage apparatus and electric vehicles. Among secondary batteries, non-aqueous electrolyte secondary batteries with high voltage and high energy density are being developed actively.

As for lithium ion secondary batteries representing non-aqueous electrolyte secondary batteries, the positive electrode active material is required to have a high capacity density and good reversibility in a high voltage range. For this reason, lithium-containing transition metal composite oxides such as lithium cobalt oxide ($LiCoO_2$), lithium nickel oxide ($LiNiO_2$), and lithium nickel manganese cobalt oxide ($LiNi_{1/3}Mn_{1/3}Co_{1/3}O_2$) have been used as the positive electrode active material.

When non-aqueous electrolyte secondary batteries are stored at high temperatures, problematically, gas generation occurs at the surface of the positive electrode active material, causing the battery to swell. In particular, in an attempt to meet the demand for higher energy densities in recent years, there is a case where the density of active material is increased so that the ratio of the space occupied by the active material within the battery can be increased. In this case, the space allowing the generated gas to enter is reduced, and the swelling of the battery becomes more noticeable. Conventionally, such gas generation has been considered as being by-produced in the production process of a positive electrode active material or positive electrode, and as being attributed to the presence of lithium carbonate and the like in the vicinity of the positive electrode active material, and various attempts have been made to reduce them.

For example, Patent Literature 1 proposes that the amount of lithium carbonate present on the surface of a lithium nickel composite oxide be set to 0.20 mass % or less, relative to the lithium nickel composite oxide, and a porous layer containing an inorganic oxide and lithium carbonate be provided on the surface of the positive electrode.

Patent Literature 2 proposes that a phosphorus compound be contained in the positive electrode active material near its surface by treating the positive electrode active material with phosphorous acid or a phosphoric acid compound. Patent Literature 2 also proposes that the concentration of carbonate and hydrogencarbonate in the positive electrode active material be set to 0.30 wt % or less.

As a proposal for improving the safety, for example, Patent Literature 3 suggests that lithium carbonate be present concentratedly at the surface of active material. The purpose of employing this method in Patent Literature 3 is to cause gas generation effectively during overcharge so that the safety valve can operate more reliably. In Patent Literature 3, the content of lithium carbonate in the active material layer is set to 0.3 wt % or more in order to maximize the effect of adding lithium carbonate.

CITATION LIST

Patent Literature

[PTL 1] Japanese Laid-Open Patent Publication No. 2008-277087
[PTL 2] Japanese Laid-Open Patent Publication No. 2008-251434
[PTL 3] Japanese Laid-Open Patent Publication No. 2005-108513

SUMMARY OF INVENTION

Technical Problem

Reducing the amount of lithium carbonate as proposed by Patent Literature 1 is effective to some extent in reducing the swelling of the battery. The present inventors have found, however, that when the amount of lithium carbonate becomes too small, the cycle characteristics are degraded.

Treating the positive electrode active material with a phosphoric acid compound or the like as proposed by Patent Literature 2 increases the production cost, and is economically disadvantageous.

Moreover, even though the amount of carbonate contained in the positive electrode active material can be decreased, the production process of the positive electrode is influenced by water contained in the dispersion medium used for slurry preparation and by moisture and carbonic acid gas in the air. Therefore, even if the amount of carbonate in the positive electrode active material itself is decreased as suggested by Patent Literatures 1 and 2, sufficient suppression of gas generation cannot be expected in the resultant positive electrode.

Furthermore, when the amount of lithium carbonate contained in the active material layer is increased as proposed by Patent Literature 3 in order to cause gas generation effectively during overcharge, if the battery is stored at high temperatures, a large amount of gas will be generated, to increase the swelling of the battery.

Solution to Problem

The present invention intends to solve the above-discussed problems and provide a non-aqueous electrolyte secondary battery excellent in storage characteristics and cycle characteristics.

One aspect of the present invention relates to a non-aqueous electrolyte secondary battery including: a positive electrode including a lithium-containing transition metal composite oxide as a positive electrode active material, a negative electrode including a negative electrode active material, a separator interposed between the positive electrode and the negative electrode, and a non-aqueous electrolyte. The positive electrode contains lithium carbonate and lithium hydrogencarbonate in a total amount of 500 ppm or more and 3000 ppm or less, and exhibits a weight loss by temperature increase from 25° C. to 300° C. at 5° C./min of 70% or less of the total amount and of 1500 ppm or less.

Another aspect of the present invention relates a method for producing a non-aqueous electrolyte secondary battery. The method includes the steps of: applying a positive electrode slurry including a lithium-containing transition metal composite oxide as a positive electrode active material to a surface of a positive electrode current collector, followed by drying and pressing, thereby to form a positive electrode; heating the positive electrode at a temperature of 250° C. or more and 300° C. or less, to allow the positive electrode to satisfy the following requirements that
 (i) a total amount of lithium carbonate and lithium hydrogencarbonate contained in the positive electrode be 500 ppm or more and 3000 ppm or less, and
 (ii) a weight loss by temperature increase from 25° C. to 300° C. at 5° C./min be 70% or less of the total amount, and be 1500 ppm or less; and encasing an electrode group and a non-aqueous electrolyte in a battery case. The electrode group includes the positive electrode satisfying the above requirements, a negative electrode including a negative electrode active material, and a separator interposed between the positive electrode and the negative electrode.

Advantageous Effects of Invention

According to the present invention, it is possible to provide a non-aqueous electrolyte secondary battery which is capable of suppressing gas generation even when stored at high temperatures and thus excellent in storage characteristics, and is excellent in cycle characteristics, i.e., characteristics that can maintain a high capacity even after repetitive charge and discharge.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

A non-aqueous electrolyte secondary battery of the present invention includes: a positive electrode including a lithium-containing transition metal composite oxide as a positive electrode active material, a negative electrode including a negative electrode active material, a separator interposed therebetween, and a non-aqueous electrolyte. The positive electrode contains lithium carbonate and lithium hydrogencarbonate in a total amount of 500 ppm or more and 3000 ppm or less, and exhibits a weight loss by temperature increase from 25° C. to 300° C. at 5° C./min (hereinafter simply also referred to as a "weight loss") of 70% or less of the total amount, and of 1500 ppm or less. By controlling the total amount of lithium carbonate and lithium hydrogencarbonate contained in the positive electrode and the weight loss as above, the amount of gas generated can be reduced even after the battery is stored at high temperatures, and excellent cycle characteristics can be obtained. The present invention is described in detail below.

By reducing the total amount of lithium carbonate and lithium hydrogencarbonate contained in the positive electrode, the amount of gas generated while the battery is stored can be reduced to some extent. However, the present inventors have found that even if the total amount is reduced beyond that, the effect to reduce the amount of generated gas is small, and in contrast to the intention, the cycle characteristics are deteriorated.

In the present invention, since the total amount of lithium carbonate and lithium hydrogencarbonate contained in the positive electrode is controlled to 500 ppm or more, and the weight loss is controlled to 70% or less of the total amount, the deterioration in cycle characteristics can be prevented. This is presumably because a stable film derived from lithium carbonate is formed in an appropriate amount on the surface of the negative electrode in the early stage of charge, and this can inhibit the side reaction at the surface of the negative electrode.

In addition, in the positive electrode of the present invention, the total amount of lithium carbonate and lithium hydrogencarbonate is controlled to 3000 ppm or less, and the weight loss is controlled to 1500 ppm or less. By using such a positive electrode, it is possible to suppress gas generation even when the battery is stored at high temperatures.

In order to reduce the amount of gas to be generated, it is particularly effective to reduce the amount of lithium hydrogencarbonate, in addition to controlling the total amount of lithium carbonate and lithium hydrogencarbonate to 3000 ppm or less. By controlling the weight loss to 1500 ppm or less, the amount of lithium hydrogencarbonate is considered to be reduced, and the amount of gas generated during storage is reduced, resulting in less swelling of the battery.

Lithium carbonate is by-produced in the production process of a positive electrode active material or positive electrode. Particularly in the case where alkali such as lithium hydroxide is used in the production process of a positive electrode active material, the alkali reacts with ambient carbonic acid gas, to readily produce lithium carbonate. The produced lithium carbonate reacts with ambient moisture, to produce lithium hydrogencarbonate.

Lithium hydrogencarbonate is unstable as compared with other hydrogencarbonates (e.g., sodium hydrogencarbonate and potassium hydrogencarbonate), and it is extremely difficult to allow lithium hydrogencarbonate itself to be present stably. Lithium hydrogencarbonate is readily decomposed into lithium carbonate, and produces carbonic acid gas and water when decomposed. On the other hand, lithium carbonate is comparatively stably present even at high temperatures. If a battery is produced while unstable lithium hydrogencarbonate remains in the positive electrode, rather than lithium carbonate, gas generation would be increased in the subsequent storage at high temperatures, increasing the swelling of the battery. Therefore, desirably, the amount of lithium hydrogencarbonate present within the battery is reduced to be as small as possible. In order to do this, it is preferable to produce a battery using a positive electrode in which the content of lithium hydrogencarbonate is already small.

Here, an index that can be used as the reduction of lithium hydrogencarbonate is the aforementioned weight loss. The total amount of lithium carbonate and lithium hydrogencarbonate has been conventionally quantified by analyzing the content of carbonic acid. It is difficult, however, to directly analyze the presence amount of lithium hydrogencarbonate alone because lithium hydrogencarbonate is unstable. On the other hand, lithium hydrogencarbonate is readily decomposed when heated to produce carbonic acid gas and water. Taking this property into consideration, by measuring the weight loss associated with release of carbonic acid gas and water vapor, the presence amount of lithium hydrogencarbonate can be indirectly evaluated.

To be more specific, the weight loss due to heating can be measured by thermogravimetry (TG). In the case of using a positive electrode exhibiting a weight loss by temperature increase from 25° C. to 300° C. at 5° C./min as measured by TG of 1500 ppm or less is used, a battery that shows less swelling and has excellent cycle characteristics can be provided. It is to be noted that by heating the positive electrode under the conditions as above, adsorbed water contained in the positive electrode would also be released. This means that the above weight loss includes a weight loss associated with the release of adsorbed water. In view of the properties of non-aqueous electrolyte batteries, the ratio is, however, extremely small, which is, for example, 100 ppm or less, and preferably 80 ppm or less.

The total amount of lithium carbonate and lithium hydrogencarbonate contained in the positive electrode is controlled preferably to 1000 ppm or more, and more preferably to 1100 ppm or more. The total amount is controlled preferably to 2800 ppm or less, and more preferably to 2500 ppm or less. These upper and lower limits of the total amount of lithium carbonate and lithium hydrogencarbonate may be selected and combined with each other as appropriate.

The weight loss is controlled preferably to 1400 ppm or less, and more preferably to 1300 ppm or less. The lower limit of the weight loss is not particularly limited, and the weigh loss is, for example, 200 ppm or more, 300 ppm or more, or 500 ppm or more. These upper and lower limits of the weight loss may be selected and combined with each other as appropriate.

The weight loss is 70% or less, preferably 65% or less, and more preferably 55% or less of the total amount. When the weight loss is within such a range, it is possible to keep a certain amount of lithium carbonate in the positive electrode, while reducing the amount of lithium hydrogencarbonate contained therein. This can suppress gas generation, while maintaining excellent cycle characteristics. The lower limit of the weight loss relative to the total amount is not particularly limited, and the weight loss is, for example, 15% or more, 30% or more, or 45% or more. These upper and lower limits of the weight loss relative to the total amount may be selected and combined with each other as appropriate.

Here, the reason why the appropriate values of the content of lithium carbonate in the positive electrode and the weight loss vary within a somewhat wide range as mentioned above is presumably in that the surface condition is different among individual positive electrode active materials.

One of the methods to control the total amount of lithium carbonate and lithium hydrogencarbonate in the positive electrode to be within a specific range, and reduce the amount of lithium hydrogencarbonate as above is heating the positive electrode at a temperature ranging from 250° C. or more to 300° C. or less. This temperature range is a range within which lithium hydrogencarbonate is readily decomposed into lithium carbonate to produce carbonic acid gas and water. By heating the positive electrode at a temperature within this range, the decomposition is allowed to proceed efficiently, and unstable lithium hydrogencarbonate can be effectively reduced. Moreover, by this heating, lithium carbonate is decomposed simultaneously, and therefore, a certain amount of lithium carbonate can also be reduced. It is considered that, although lithium carbonate itself has a thermal decomposition temperature of 700° C. or more, it can be decomposed even at the above heating temperatures probably because it is present at the surface of the electrode and thus can be activated.

The heating as above enables the control of the presence amount of lithium carbonate and lithium hydrogencarbonate within an optimum range. Therefore, in a non-aqueous electrolyte secondary battery including the positive electrode thus obtained, even when stored at high temperatures, the generation of gas can be effectively suppressed, and the deterioration in cycle characteristics can be suppressed.

When the heating temperature is below 250° C., lithium hydrogencarbonate might not be sufficiently removed from the positive electrode. On the other hand, when the heating temperature is above 300° C., the amount of lithium carbonate contained in the positive electrode might be reduced too much, causing the cycle characteristics to deteriorate.

The heating temperature is preferably 260° C. or more, and more preferably 270° C. or more. The heating temperature is preferably 290° C. or less, and more preferably 280° C. or less. These upper and lower limits of the heating temperature may be selected and combined with each other as appropriate.

As for the duration of heating, although depending on the environment in which the positive electrode is left standing before heating (e.g., dew point temperature, temperature during standing, and duration of standing), for example, by heating the positive electrode at a temperature within the above range for 3 hours or more, lithium hydrogencarbonate can be effectively reduced. The duration of heating is preferably 5 hours or more, and more preferably 10 hours or more. Even if the duration of heating is prolonged, the total amount of lithium carbonate and lithium hydrogencarbonate and the weight loss will not change so much. Therefore, the upper limit of the duration of heating is not particularly limited, and is, for example, 80 hours.

The heating can be performed in the air, and is preferably performed in a dry atmosphere. The dew point temperature of the atmosphere during heating is, for example, −20° C. or less, and preferably −30° C. or less.

The positive electrode is generally formed by applying a positive electrode slurry including a positive electrode active material onto a surface of a positive electrode current collector, followed by drying and pressing. The above heating may be performed at any stage in the production process of a positive electrode. It is to be noted that even though the content of lithium carbonate and lithium hydrogencarbonate is controlled by heating the positive electrode as described above, the positive electrode will absorb carbonic acid gas and water in the air after the heating, depending on the environment in which it is left standing, and lithium hydrogencarbonate will be produced again in the positive electrode. Therefore, it is preferable to heat the positive electrode after pressing. In other words, by heating as above at the final stage of the production process of a positive electrode to reduce lithium hydrogencarbonate, the gas generation can be reduced.

The heating of the positive electrode may be performed two or more times. For example, in the case where, after the heating, the positive electrode is left standing under the influence of carbonic acid gas and/or water, the heating may be performed again. In this case, lithium hydrogencarbonate reproduced during standing can be reduced again.

The non-aqueous electrolyte secondary battery can be produced by encasing an electrode group comprising the positive electrode satisfying the above requirements for the total amount and the weight loss, a negative electrode including a negative electrode active material, and a separator interposed between the positive electrode and the negative electrode, and a non-aqueous electrolyte, in a battery case.

For suppressing the reproduction of lithium hydrogencarbonate, it is more preferable to perform the above heating immediately before the formation of a battery.

A detailed description is given below of each component of the non-aqueous electrolyte secondary battery.

(Positive Electrode)

The positive electrode current collector may be a sheet-like electrically conductive substrate. The conductive substrate may be a non-porous substrate, or a porous substrate having a plurality of through-holes. Examples of a non-porous current collector include metal foil and metal sheet. Examples of a porous current collector include metal mesh, perforated metal sheet, metal sheet having through-holes, and expanded metal.

The thickness of the positive electrode current collector can be selected from the range of, for example, 3 to 50 µm.

The material of the positive electrode current collector may be, for example, a metal such as aluminum, titanium, or tantalum; an alloy thereof; or stainless steel. Among them, Al or an alloy thereof is preferred because it is light in weight and advantageous in terms of energy density.

The lithium-containing transition metal composite oxide as the positive electrode active material may be, for example, a metal oxide containing lithium and a transition metal element, or an oxide in which part of the transition metal element in the foregoing metal oxide is replaced with another element. Examples of the transition metal element include Sc, Y, Mn, Fe, Co, Ni, Cu, and Cr. Preferred among these transition metal elements are Mn, Co, and Ni. Examples of another element include Na, Mg, Zn, Al, Pb, Sb, and B. Preferred among these another elements include Mg and Al. These transition metal elements and another elements may be respectively used singly or in combination of two or more.

Examples of the lithium-containing transition metal composite oxide include $Li_xCoO_2$, $Li_xMnO_2$, $Li_xNi_yM_{1-y}O_2$, $Li_xCo_zMe_{1-y}O_n$ and $Li_xMn_2O_4$. In these formulae, M represents at least one element selected from the group consisting of Sc, Y, Co, Mn, Cr, Fe, Cu, Na, Mg, Ti, Zn, Al, Pb, Sb, and B; Me represents at least one element selected from the group consisting of Sc, Y, Mn, Cr, Fe, Ni, Cu, Na, Mg, Ti, Zn, Al, Pb, Sb, and B; and x, y, and z satisfy $0.95 \leq x \leq 1.1$, $0.3 \leq y \leq 1$, and $0 < z \leq 1$, respectively. These lithium-containing transition metal composite oxides may be used singly or in combination of two or more.

In the case where, among these lithium-containing transition metal composite oxides, one containing nickel as the transition metal oxide is included in the positive electrode, lithium carbonate and lithium hydrogencarbonate are readily produced. Therefore, the present invention is particularly advantageously applied when the positive electrode includes a lithium-containing transition metal composite oxide represented by the formula (1): $Li_xNi_yM_{1-y}O_2$ as the positive electrode active material. In the formula (1), M is at least one selected from the group consisting of Co, Mn, Cr, Fe, Mg, Ti, and Al.

Such a material containing nickel has a larger capacity, is more inexpensive, and has a higher energy density than $LiCoO_2$. It is to be noted that in the above formula (1), when the molar ratio y of nickel is within the above range, the merit of a high capacity can be easily attained. Moreover, advantageously, the entry of by-products of the nickel oxide into the resultant lithium nickel composite oxide can be more effectively reduced, and the purity of the active material can be increased, which can suppress the reduction in the apparent energy density of the active material.

When the molar ratio x of lithium is within the above range, advantageously, the available lithium ions can be sufficiently ensured, and the reduction in capacity can be suppressed. Moreover, the entry of by-products such as a lithium salt into the resultant lithium nickel composite oxide can be more effectively suppressed, and the purity of the active material can be increased, which can more effectively suppress the reduction in the apparent energy density of the active material.

In the above general formula (1), the mole ratio x of lithium represents the amount of lithium contained in the positive electrode active material immediately after its production. The mole ratio x of lithium varies during charge and discharge.

As mentioned above, a material containing nickel has a merit in that it has a larger capacity, is more inexpensive, and has a higher energy density than $LiCoO_2$. The material, however, is highly alkaline, and because of this, oxidation of a non-aqueous solvent such as ethylene carbonate is likely to proceed on the surface of the positive electrode. The material, therefore, has a demerit in that it produces a larger amount of gas than $LiCoO_2$. As such, in the positive electrode including a lithium-containing transition metal composite oxide represented by the formula (1) as a positive electrode active material, it is particularly preferable to control the total amount of lithium carbonate and lithium hydrogencarbonate and the weight loss within the specific range. Specifically, this makes it possible, while maintaining the merit peculiar to a material containing nickel, to provide a non-aqueous electrolyte secondary battery in which the amount of generated gas is reduced, the swelling of the battery is inhibited, and the cycle characteristics are improved.

In the above formula (1), M preferably at least includes Co and at least one selected from the group consisting of Mn and Al. When M at least includes Co and Mn, in addition to the above effects, a higher level of safety can be ensured. When M at least includes Co and Al, in addition to the above effects, a non-aqueous electrolyte secondary battery with higher capacity can be obtained.

The positive electrode active material layer including a positive electrode active material can be formed by applying a positive electrode slurry including a positive electrode active material onto a surface of a positive electrode current collector, followed by drying. After drying, the applied film is pressed into a desired thickness. The positive electrode active material layer may be formed on both surfaces or one surface of the positive electrode current collector.

The applied film can be dried by heating. The heating, however, is different from the above-described heating for controlling the content of lithium carbonate and lithium hydrogencarbonate.

The drying may be performed at any temperature that can remove the dispersion medium from the positive electrode slurry, and the temperature can be selected according to the type of the dispersion medium. The drying temperature is, for example, less than 250° C., preferably 200° C. or less, and more preferably 150° C. or less. The lower limit of the drying temperature is not particularly limited, and the drying temperature is, for example, 80° C. or more, and preferably 100° C. or more. These upper and lower limits of the drying temperature may be selected and combined with each other as appropriate.

The thickness of the positive electrode active material layer is, for example, 10 to 100 µm.

The positive electrode slurry usually includes, together with a positive electrode active material, a binder and a dispersion medium, and may additionally contain a conductive material and a thickener, if necessary.

The binder is not particularly limited and may be of any material that is stable against the solvent used for producing a positive electrode, and the non-aqueous electrolyte. Examples of the binder include: fluorocarbon resins, such as polyvinylidene fluoride and polytetrafluoroethylene (PTFE); acrylic resins, such as polymethyl acrylate and ethylene-methyl methacrylate copolymer; and rubber-like materials, such as styrene-butadiene rubber, butadiene rubber, isoprene rubber, acrylic rubber, ethylene-propylene-diene polymer (EPDM), and modified products of these. These may be used singly or in combination of two or more as the binder.

The content of the binder is, for example, from 0.1 to 5 parts by mass, and preferably from 0.2 to 1 part by mass per 100 parts by mass of the active material.

Examples of the dispersion medium include water, alcohols such as ethanol, ethers such as tetrahydrofuran, N-methyl-2-pyrrolidone, and mixed solvents of these.

Examples of the conductive material include: metal materials such as Cu and Ni; and electrically conductive carbon materials, such as carbon black, carbon fibers, nature or artificial graphite, and fluorinated carbon. The content of the conductive material is, for example, from 0.1 to 10 parts by mass per 100 parts by mass of the active material.

The positive electrode slurry preferably includes a positive electrode active material, a binder including PTFE, a conductive material, and water serving as a dispersion medium. The positive electrode slurry may include a thickener, if necessary. In the case where the content of lithium carbonate and lithium hydrogencarbonate is controlled by heating, when an organic medium is used as a dispersion medium, the rigidity of the positive electrode might be sometimes reduced. It is therefore advantageous to use a positive electrode slurry having a composition as above. The content of PTFE in the binder is, for example, 90% by mass or more, and preferably, 95% by mass or more.

Examples of the thickener include: cellulose derivatives, such as methyl cellulose, hydroxymethyl cellulose, carboxymethyl cellulose (CMC), and ethyl cellulose; poly$C_{2-4}$alkylene glycol, such as polyethylene glycol; polyvinyl alcohol (PVA); oxidized starch, and phosphorylated starch; and casein. The content of the thickener is, for example, from 0.1 to 10 parts by mass, and preferably from 0.1 to 5 parts by mass per 100 parts by mass of the active material.

(Negative Electrode)

The negative electrode includes a negative electrode active material. The negative electrode usually includes a negative electrode current collector and a negative electrode active material layer adhering to the surface of the negative electrode current collector.

The form and the thickness of the negative electrode current collector can be selected from those exemplified as the positive electrode current collector.

The material of the negative electrode current collector may be, for example, metal such as copper or nickel, an alloy thereof, or stainless steel. Among them, copper foil is preferred because of its easy processability into a thin film and its low cost.

The negative electrode can be formed in a similar manner to the positive electrode. The negative electrode active material layer may be formed on both surfaces or one surface of the negative electrode current collector. The thickness of the negative electrode active material layer, the content of the binder, the content of the conductive material, and the content of the thickener can be selected from the ranges similar to those of the positive electrode active material layer.

The negative electrode active material may be any material that is capable of reversibly absorbing and releasing lithium ions, examples of which include: a material having a graphite-like crystal structure; a non-graphitic carbon material, such as a low-temperature baked carbon; silicon; a silicon-containing compound, such as a silicon oxide; tin; a tin-containing oxide; and a lithium alloy containing Sn, Al, Zn and/or Mg.

Examples of the material having a graphite-like crystal structure include carbon materials, such as natural or artificial graphite, a non-graphitizable carbon and a graphitizable carbon. Natural graphite may be purified natural graphite. Other examples of the material having a graphite-like crystal structure include graphites produced by subjecting graphitizable pitches obtained from various raw materials to a high-temperature treatment, and materials prepared by subjecting these graphites to various surface treatments with pitch. These negative electrode active materials may be used singly or in combination of two or more. A preferable negative electrode active material is graphite.

Alternatively, graphite may be combined with another negative electrode active material. Examples of the negative electrode active material that may be combined with graphite include a hardly-graphitizable carbon, an easily-graphitizable carbon, a metal oxide such as silicon oxide or tin oxide, a lithium alloy, and lithium metal. One of these negative electrode active materials, or two or more of them may be used in combination with graphite.

(Separator)

The separator may be: an organic microporous film, such as microporous resin film, non-woven resin fabric, or woven resin fabric; or an inorganic microporous film.

Examples of the resin constituting the organic microporous film include: polyolefin, such as polyethylene and polypropylene; polyamide; polyamide-imide; and polyimide.

The inorganic microporous film includes, for example, an inorganic filler and an organic binder. Examples of the inorganic filler include metal oxides which are inactive in the battery, such as alumina and silica. Examples of the organic binder include: polyolefin, such as polyethylene (PE) and polypropylene (PP); polyamide; polyamide-imide; and polyimide.

It suffices if the separator is arranged between the positive electrode and the negative electrode so as to electrically insulate them from each other. For example, the separator may be sandwiched between the positive electrode and the negative electrode. Alternatively, a solution or dispersion including a separator material may be applied onto a surface of the positive or negative electrode, and then dried, to form a separator layer.

The separator may be composed of a plurality of films differing in the composition or material, or may be a multi-layered film comprising a plurality of layers differing in the composition or material. For example, the separator may be an organic multi-layered film including a porous PE layer and a porous PP layer, or may comprise an organic microporous film such as a PE porous film and an inorganic microporous film.

The thickness of the separator may be selected as appropriate from the range of 1 to 100 µm. In the case where the separator comprises an organic microporous film only, the thickness thereof is preferably 10 to 40 µm. In the case where the separator comprises an inorganic microporous film only, the thickness thereof is preferably 1 to 20 µm. In the case where the separator comprises both an inorganic microporous film and an organic microporous film, the thickness of the inorganic microporous film is preferably 1 to 10 μm, and the thickness of the organic microporous film is preferably 5 to 30 μm.

(Non-Aqueous Electrolyte)

The non-aqueous electrolyte includes a non-aqueous solvent and a lithium salt.

Examples of the non-aqueous solvent include: cyclic carbonates (e.g., alkylene carbonates), such as ethylene carbonate (EC), propylene carbonate (PC), and butylene carbonate; chain carbonates (e.g., dialkyl carbonates), such as dimethyl carbonate (DMC), diethyl carbonate (DEC), ethyl methyl carbonate (EMC), din-propyl carbonate, methyl n-propyl carbonate, ethyl n-propyl carbonate, methyl i-propyl carbonate, and ethyl i-propyl carbonate; and cyclic carboxylic acid esters, such as γ-butyrolactone and γ-valerolactone. These non-aqueous solvents may be used singly or in combination of two or more.

Preferably, the non-aqueous solvent at least includes a cyclic carbonate and a chain carbonate. The volume ratio of the cyclic carbonate to the chain carbonate in the non-aqueous solvent is, for example, from 2:8 to 7:3, and is preferably from 2.5:7.5 to 5:5. The content of the cyclic carbonate and the chain carbonate in the whole non-aqueous solvent is, for example, 80 to 100% by volume, and is preferably 90 to 98% by volume.

The cyclic carbonate is preferably $C_{2-4}$alkylene carbonate, and specifically at least one selected from the group consisting of EC, PC, and butylene carbonate. The use of such a non-aqueous solvent can facilitate the formation of a stable film on the surface of the negative electrode in the early stage of charge, and further can reduce the decomposition of the solvent itself. This makes it possible to provide a battery having more excellent cycle characteristics. Moreover, such a non-aqueous solvent, because of its high dielectric constant, is also advantageous in providing a non-aqueous electrolyte secondary battery having a high power output. The stable film formed on the surface of the negative electrode in the early stage of charge is a film derived at least from lithium carbonate. The formation of such a film inhibits a side reaction on the surface of the negative electrode, and thus, the deterioration of the negative electrode is suppressed, resulting in improved cycle characteristics.

The chain carbonate to be used in combination with a cyclic carbonate is preferably $diC_{1-3}$alkyl carbonate, and specifically, at least one selected from the group consisting of DMC, DEC, EMC, din-propyl carbonate, methyl n-propyl carbonate, ethyl n-propyl carbonate, methyl i-propyl carbonate, and ethyl i-propyl carbonate. The use of such a chain carbonate decreases the viscosity of the non-aqueous electrolyte and improves the wettability of the active material with the non-aqueous electrolyte, and as a result, a stable film can be readily formed on the surface of the negative electrode. Therefore, it is advantageous in improving the cycle characteristics. Furthermore, the use of the above chain carbonate can improve the movability of electrolyte ions in the non-aqueous electrolyte, and therefore, is also advantageous in providing a non-aqueous electrolyte secondary battery having a high power output.

The chain carbonate particularly preferably includes DEC and EMC. The volume ratio of DEC to EMC is, for example, from 25:75 to 75:25, and is preferably from 26:74 to 50:50, and more preferably from 27:73 to 40:60. By setting the volume ratio of DEC to EMC within this range, the decomposition of EMC during charge and discharge or during storage at high temperatures can be more effectively suppressed, and the increase in gas generation can be suppressed even when the battery is repetitively charged and discharged or stored at high temperatures. Moreover, advantageously, the increase in the viscosity of the non-aqueous electrolyte can be more effectively suppressed, to suppress the reduction in wettability of the active material with the non-aqueous electrolyte, and the formation of a stable film on the surface of the negative electrode can be facilitated. This can further improve the cycle characteristics and high-temperature storage characteristics.

Examples of the lithium salt include: $LiPF_6$, $LiClO_4$, $LiAsF_6$, $LiCF_3SO_3$, $LiN(SO_2CF_3)_2$, $LiN(SO_2C_2F_5)_2$, and $LiC(SO_2CF_3)_3$. These may be used singly or in combination of two or more as the lithium salt.

The concentration of the lithium salt in the non-aqueous electrolyte is, for example, 0.5 to 1.5 mol/L.

The non-aqueous electrolyte may further include a known additive. Such an additive may be, for example, a carbonic acid ester different from the aforementioned cyclic carbonate and the aforementioned chain carbonate, a sulfur compound, or an aromatic compound. These additives may be used singly or in combination of two or more. For example, a carbonic acid ester may be used in combination with a sulfur compound.

Examples of the carbonic acid ester that can be used as an additive include: an unsaturated cyclic carbonate, such as vinylene carbonate, phenylvinylene carbonate, and diphenylvinylene carbonate; an alkylene carbonate having a substituent; an aromatic ring-condensed cyclic carbonate, such as catechol carbonate; a diaryl carbonate, such as diphenyl carbonate; and a dialkyl dicarbonate, such as diethyl dicarbonate. Examples of the alkylene carbonate having a substituent include: an alkoxyalkylene carbonate, such as methoxypropylene carbonate; an alkenylalkylene carbonate, such as vinylethylene carbonate; an arylalkylene carbonate, such as phenylethylene carbonate; and a halogenated alkylene carbonate, such as trifluoropropylene carbonate and chloroethylene carbonate. These carbonic acid esters may be used singly or in combination of two or more. Particularly preferred among these carbonic acid esters is vinylene carbonate.

Examples of the sulfur compound that can be used as an additive include: a sulfite, such as ethylene sulfite, catechol sulfite, and tetrahydrofuran sulfite; a trithiocarbonate, such as ethylene trithiocarbonate and vinylene trithiocarbonate; a sulfolane, such as sulfolane and 3-methylsulfolane; a sulfolene, such as 3-sulfolene; a sultone, such as 1,3-propane sultone and 1,4-butane sultone; and substitution products of these. The substitution products are, for example, compounds corresponding to the above exemplified sulfur compounds and having various substituents which are exemplified by: an alkyl group; an alkoxy group; an aliphatic acyloxy group, such as acetoxy group; an aryl group, such as phenyl group; a carboxy alkyl group, such as carboxymethyl group; a hydroxyalkyl group, such as hydroxymethyl group; carboxyl group; hydroxyl group; a halogen atom; oxygen atom (=O); and sulfur atom (=S). The substitution product may have one or two or more substituents. These sulfur compounds may be used singly or in combination of two or more. Particularly preferred among them are 1,3-propane sultone and a substitution product thereof.

Examples of the aromatic compound that can be used as an additive include: cyclohexylbenzene, biphenyl, and diphenyl ether.

The content of the additive in the whole non-aqueous electrolyte is, for example, 0.1 to 7% by mass, and is preferably 0.5 to 5% by mass.

(Others)

The electrode group may be formed by winding the positive electrode, the negative electrode, and the separator interposed between the positive and negative electrodes so as to electrically insulate them from each other. The electrode group is not limited to a wound electrode group, and may be a stacked electrode group or a zigzag-folded electrode group.

The shape of the electrode group may be any shape according to, for example, the shape of the intended non-aqueous electrolyte secondary battery, and is, for example, cylindrical or flat. The shape of the non-aqueous electrolyte secondary battery may be cylindrical or prismatic.

The battery case may be made of a material such as stainless steel, aluminum, or an aluminum alloy (e.g., an aluminum alloy containing a small amount of metal such as manganese or copper).

A prismatic non-aqueous electrolyte secondary battery according to one embodiment of present invention is described below with reference to FIG. 1 appended hereto.

Figure 1:
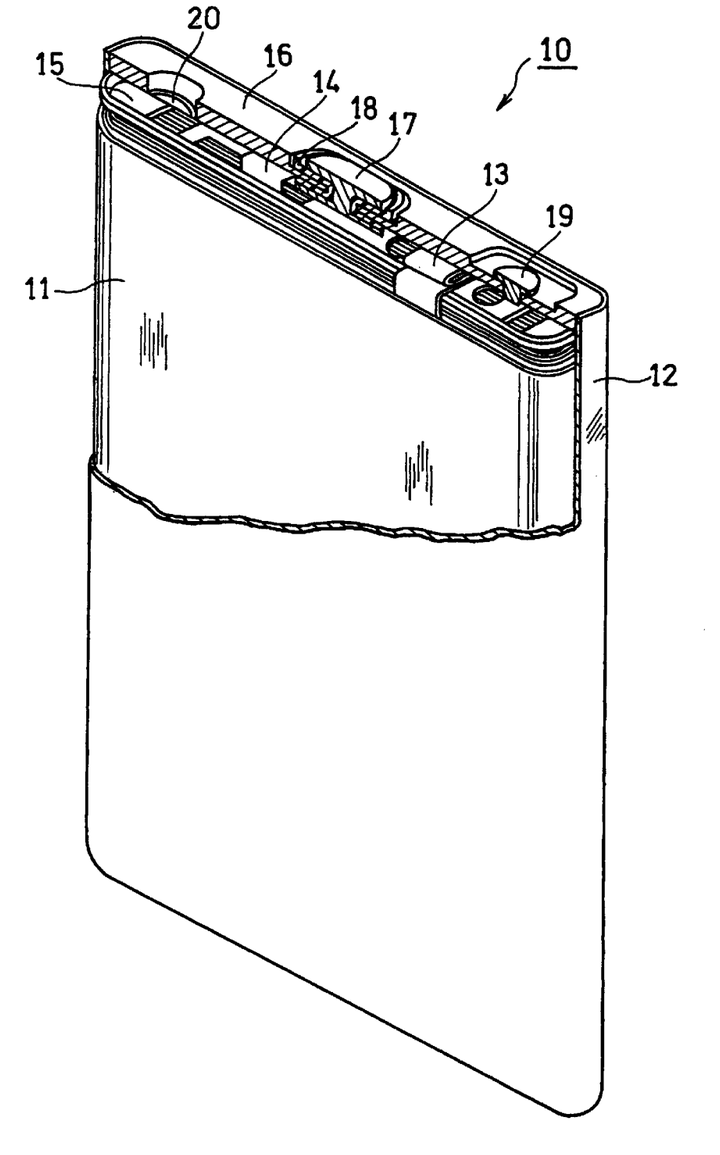
FIG. 1 A partially exploded oblique view of a lithium ion secondary battery according to one embodiment of the present invention

As illustrated in FIG. 1, a lithium ion secondary battery of the present embodiment includes an electrode group 11, a non-aqueous electrolyte (not shown), and a bottomed cylindrical battery case 12 made of aluminum accommodating these. The electrode group 11 is formed by winding a stack of the positive electrode satisfying the above requirements, a negative electrode, and a separator interposed therebetween. A positive electrode lead 13 and a negative electrode lead 14 are connected to the positive electrode and the negative electrode, respectively. The opening of the battery case 12 accommodating the electrode group 11 and the non-aqueous electrolyte is sealed with a sealing plate 16 serving as a positive electrode terminal. The sealing plate 16 has an aperture for exposing a negative electrode terminal 17 outside therethrough, a non-aqueous electrolyte injection port to be closed with a sealing stopper 19, and an explosion prevention valve 20. The sealing plate 16 is bonded to the opening end of the battery case 12 by, for example, laser welding, and the negative electrode terminal 17 surrounded by an insulation gasket 18 is exposed outside through the aperture. The positive electrode lead 13 is connected to the inner surface of the sealing plate 16, and the negative electrode lead 14 is connected to the negative electrode terminal 17. On top of the electrode group 11, an insulator 15 for preventing a short circuit with the negative electrode lead 14 is placed.

EXAMPLES

The present invention is specifically described below by way of Examples and Comparative Examples. It should be noted, however, that Examples should not be construed as limiting the scope of the present invention.

Example 1

A positive electrode active material ($LiNi_{0.4}Mn_{0.3}Co_{0.3}O_2$), PTFE serving as a binder, acetylene black serving as a conductive material, and CMC serving as a thickener were blended in a mass ratio of 90:4:5:1, and mixed together while water serving as a dispersion medium was being added thereto, to prepare a positive electrode slurry. The positive electrode slurry was applied onto both surfaces of an Al foil (thickness: 15 μm) serving as a current collector, and heated at 120° C. to remove water, followed by pressing with a roll press. The resultant product was cut into a predetermined size, and heated at 250° C. for 16 hours in a dry air (dew point temperature: −30° C.), to obtain a positive electrode. The carbonic acid content and the weight loss in the positive electrode before heating were measured in a manner as described hereinafter. The carbonic acid content was 4500 ppm, and the weight loss was 1000 ppm.

Next, a negative electrode active material, CMC serving as a thickener, and SBR serving as a binder were blended in a mass ratio of 100:2:2, and mixed together while water serving as a dispersion medium was being added thereto, to prepare a negative electrode slurry. The negative electrode active material used here was a material prepared by subjecting a purified natural graphite to a surface treatment with pitch. The negative electrode slurry was applied onto both surfaces of a Cu foil (thickness: 10 μm) serving as a current collector, and dried at 200° C. to remove water. The resultant product was pressed with a roll press and cut into a predetermined size, to obtain a negative electrode.

The positive and negative electrodes thus obtained, and a 16-μm-thick separator made of PE were used to form an electrode group, and the electrode group was encased together with a non-aqueous electrolyte in a battery case, whereby a non-aqueous secondary battery as illustrated in FIG. 1 was produced. The production of the electrode group and the non-aqueous electrolyte secondary battery were carried out in a dry air. The size of the produced battery was 50 mm in height, 34 mm in length, and 5 mm in width, and the battery capacity was 900 mAh. The non-aqueous electrolyte used here had been prepared by dissolving $LiPF_6$ at a concentration of 1.0 mol/L in a non-aqueous solvent containing EC, DEC and EMC in a volume ratio of 3:2:5.

Comparative Example 1

A positive electrode was produced without heating in a dry air after pressing. A battery was produced in the same manner as in Example 1, except for using the obtained positive electrode.

Examples 2 to 9 and Comparative Examples 1 to 6

Positive electrodes were produced in the same manner as in Example 1, except that the temperature and the duration of heating were changed as shown in Table 1. Batteries were produced in the same manner as in Example 1, except for using the obtained positive electrodes. The carbonic acid content and the weight loss in the positive electrode before heating were measured in the manner as described hereinafter. The carbonic acid content was 4500 to 7300 ppm, and the weight loss was 2000 to 4100 ppm.

Example 10

A positive electrode was produced in the same manner as in Example 1, except that the heating in Example 1 was not performed, and instead, the positive electrode was heated at 300° C. for 16 hours in a dry air, and then left standing for 72 hours in an environment having a dew point of 0° C. and a temperature of 25° C., followed by further heating at 300° C. for 16 hours in a dry air. A battery was produced in the same manner as in Example 1, except for using the obtained positive electrode. The carbonic acid content and the weight loss in the positive electrode before heating were measured in the manner as described hereinafter. The carbonic acid content was 4500 ppm, and the weight loss was 2100 ppm.

Example 11

A non-aqueous electrolyte was prepared in the same manner as in Example 1, except that vinylene carbonate and 1,3-propane sultone were added in an amount of 2% by mass and 1% by mass, respectively, relative to the whole non-aqueous electrolyte. A battery was produced in the same manner as in Example 1, except for using the obtained non-aqueous electrolyte. The carbonic acid content and the weight loss in the positive electrode before heating were measured in the manner as described hereinafter. The carbonic acid content was 4600 ppm, and the weight loss was 2000 ppm.

Comparative Example 7

A positive electrode was produced in the same manner as in Example 1, except that the heating in Example 1 was not performed, and instead, the positive electrode was heated at 300° C. for 16 hours in a dry air, and then left standing for 72 hours in an environment having a dew point of 0° C. and a temperature of 25° C. A battery was produced in the same manner as in Example 1, except for using the obtained positive electrode.

Comparative Example 8

A positive electrode was produced in the same manner as in Comparative Example 1, except that the positive electrode active material ($LiNi_{0.4}Mn_{0.3}CO_{0.3}O_2$) was used after immersed in pure water and stirred for 30 minutes, and then dried in vacuum. A battery was produced in the same manner as in Example 1, except for using the obtained positive electrode.

Comparative Example 9

A positive electrode was produced in the same manner as in Comparative Example 1, except that the positive electrode active material ($LiNi_{0.4}Mn_{0.3}CO_{0.3}O_2$) was used after left standing for 48 hours in an atmosphere containing 20 vol % $CO_2$. A battery was produced in the same manner as in Example 1, except for using the obtained positive electrode.

The batteries of Examples and Comparative Examples were subjected to the following measurement and evaluation.
[Measurement of Total Amount of Lithium Carbonate and Lithium Hydrogencarbonate]

The total amount of lithium carbonate and lithium hydrogencarbonate contained in the positive electrode was measured in the following manner.

The battery was disassembled to take out the positive electrode. The positive electrode was immersed in EMC to remove the non-aqueous electrolyte components from the positive electrode. Subsequently, the positive electrode was immersed in a predetermined amount of pure water to allow the lithium carbonate and lithium hydrogencarbonate contained in the positive electrode to dissolve in water, and the concentration of carbonic acid ions in the obtained aqueous solution was measured by ion chromatography. The measured amount of carbonic acid ions was converted into a carbonic acid content, thereby to determine a total amount of lithium carbonate and lithium hydrogencarbonate contained in the positive electrode.
[Measurement of Weight Loss]

The change in weight of the positive electrode associated with a change in temperature was measured in the following manner, to indirectly determine an amount of lithium hydrogencarbonate contained in the positive electrode.

The battery was disassembled to take out the positive electrode. The positive electrode was immersed in EMC to remove the non-aqueous electrolyte components from the positive electrode. Subsequently, the positive electrode was cut into a 5-cm-square piece, and the material mixture portion was scraped off from the piece, to obtain a measurement sample weighing about 90 mg. The measurement sample was set on a TG analyzer (available from TA Instruments), and subjected to temperature increase from 25° C. to 300° C. at 5° C./min in the air. The weight lost by the temperature increase was measured, to calculate a weight loss relative to the initial weight.
[Evaluation of Cycle Characteristics]

The battery was placed in a constant temperature environment of 50° C., and charged at 1.0 C (A (unit: ampere)) until the battery voltage reached a cut-off voltage of 4.2 V, and then discharged at a discharge rate of 1.0 C (A) until the battery voltage reached to a cut-off voltage of 3.0 V. One cycle consisting of the above charge and discharge was repeated for 500 cycles in total at 50° C., and the discharge capacity at the $500^{th}$ cycle was divided by the discharge capacity at the $1^{st}$ cycle, to calculate a capacity retention rate as a percentage. Here, 1.0 C is a current at which the quantity of electricity corresponding to the nominal capacity of the battery can be charged or discharged in one hour.
[Evaluation of Storage Characteristics]

The fabricated battery was placed in a constant temperature environment of 25° C., and charged at 1.0 C (A) until the battery voltage reached a cut-off voltage of 4.2 V. The battery in a fully charged state was stored for 10 hours in a constant temperature bath of 85° C., and then cooled for 4 hours in a 25° C. environment. After cooling, the thickness of the battery was measured at its center with a micrometer, to determine an amount of swelling of the battery.

The results of above evaluation are shown in Table 1, together with the treatment conditions for the positive electrode after pressing.

TABLE 1

| | Treatment conditions (temperature, duration, environment) | Carbonic acid content (ppm) | Weight loss (ppm) | Capacity retention rate (%) | Battery swelling (mm) |
|---|---|---|---|---|---|
| Ex. 1 | 250° C., 16 hr | 2535 | 1328 | 85.6 | 1.3 |
| Ex. 2 | 270° C., 16 hr | 2512 | 1308 | 85.0 | 1.2 |
| Ex. 3 | 300° C., 16 hr | 1220 | 654 | 84.5 | 1.1 |
| Ex. 4 | 250° C., 3 hr | 2834 | 1453 | 85.3 | 1.5 |
| Ex. 5 | 250° C., 6 hr | 2769 | 1413 | 85.5 | 1.4 |
| Ex. 6 | 250° C., 12 hr | 2659 | 1394 | 85.6 | 1.4 |
| Ex. 7 | 250° C., 24 hr | 2486 | 1288 | 85.5 | 1.3 |
| Ex. 8 | 250° C., 48 hr | 2346 | 1168 | 85.4 | 1.3 |
| Ex. 9 | 250° C., 72 hr | 2157 | 1069 | 85.2 | 1.2 |
| Ex. 10 | 300° C., 16 hr 25° C., 72 hr 300° C., 16 hr | 530 | 342 | 82.4 | 1.0 |
| Ex. 11 | 250° C., 16 hr | 2520 | 1290 | 87.6 | 1.0 |
| Com. Ex. 1 | Heating not performed | 7219 | 3026 | 84.1 | 2.6 |
| Com. Ex. 2 | 200° C., 16 hr | 7036 | 2547 | 84.2 | 2.5 |
| Com. Ex. 3 | 230° C., 16 hr | 6945 | 2459 | 84.4 | 2.4 |
| Com. Ex. 4 | 320° C., 16 hr | 425 | 220 | 70.3 | 1.5 |
| Com. Ex. 5 | 250° C., 1 hr | 6215 | 2906 | 84.1 | 2.3 |
| Com. Ex. 6 | 250° C., 2 hr | 5010 | 2468 | 84.2 | 2.2 |
| Com. Ex. 7 | 300° C., 16 hr 25° C., 72 hr | 2413 | 1624 | 83.2 | 2.0 |
| Com. Ex. 8 | Active material stirred in pure water, Heating not performed | 8569 | 3216 | 72.1 | 2.8 |
| Com. Ex. 9 | Active material left standing in 20% $CO_2$, Heating not performed | 9673 | 3716 | 70.1 | 3.1 |

In Comparative Examples 1 to 3, 5 and 6 including positive electrodes having a carbonic acid content exceeding 3000 ppm and exhibiting a weight loss exceeding 1500 ppm, the capacity retention rates after repetitive charge and discharge were high, but the degree of battery swelling was significantly great. In Comparative Example 4 including a positive electrode exhibiting a weight loss of 1500 ppm or less but having a carbonic acid content of less than 500 ppm, the degree of battery swelling was small, but the capacity retention rate after repetitive charge and discharge was significantly low.

The foregoing results show that in Comparative Examples 1 to 3, 5 and 6, unstable lithium hydrogencarbonate was much contained in the positive electrode, and presumably because of this, a large amount of gas was generated during storage at high temperatures, to cause the batteries to swell significantly. It is to be noted, however, that in these Comparative Examples, lithium carbonate was also much contained in the positive electrode, and presumably because of this, the formation of a stable film on the surface of the negative electrode in the early stage of charge was facilitated, and the deterioration in cycle characteristics was suppressed. In Comparative Example 4, the weight loss was small, which indicates that the content of lithium hydrogencarbonate in the positive electrode was small, and presumably because of this, the gas generation during storage at high temperatures was suppressed, resulting in a small amount of battery swelling. In Comparative Example 4, however, the carbonic acid content was small, which indicates that the content of lithium carbonate was too small, and presumably because of this, a stable film was not effectively formed on the surface of the negative electrode in the early stage of charge, resulting in deterioration in cycle characteristics.

In contrast, the batteries of Examples including positive electrodes having a carbonic acid content of 500 to 3000 ppm and exhibiting a weight loss of 1500 ppm or less, the capacity retention rates were high and the amounts of battery swelling were small even after 500 charge/discharge cycles. In short, in Examples, excellent cycle characteristics and excellent high-temperature storage characteristics were obtained. This is presumably because, in the positive electrodes, while the content of lithium carbonate was maintained at a certain level, the content of lithium hydrogencarbonate, which is stable and readily generates gas, was reduced.

The positive electrodes having a carbonic acid content of 500 to 3000 ppm and exhibiting a weight loss of 1500 ppm or less can be obtained by, for example, as in Examples, heating the positive electrode, after pressing, at a temperature ranging from 250 to 300° C. for 3 hours or more. At this time, in order to control the carbonic acid content and the weight loss in the positive electrode, it is advantageous to use, as a starting material, a positive electrode active material that allows the positive electrode before heating to contain lithium carbonate in an amount of 3000 to 7500 ppm and exhibit a weight loss of 1500 to 4500 ppm.

Even though the heating temperature was within the above range, in the positive electrodes of Comparative Examples 5 and 6 in which the heating duration was less than 3 hours, the carbonic acid content was as high as 5000 ppm or more, and the weight loss was 2400 ppm or more, which indicates that they contained a large amount of lithium hydrogencarbonate. This is presumably because the duration of treatment was short, and therefore, lithium hydrogencarbonate, which has a great influence on gas generation, was not sufficiently removed. As a result, a large amount of gas was generated during storage at high temperatures, and the thickness of the battery was increased to as large as 7 mm or more. As for the cycle characteristics, since lithium carbonate also was left unremoved, it was about 84%.

Heating for the duration of 3 hours or more can reduce the content of lithium hydrogencarbonate, while keeping the amount of lithium carbonate at an appropriate level. In Examples 1 and 4 to 9, the carbonic acid content and the weight loss were not changed so much, which shows that even though the heating duration is prolonged to 72 hours, good battery characteristics can be ensured.

In Comparative Example 7, the positive electrode was heated at 300° C. for 16 hours, and then left standing at 25° C. for 72 hours. The carbonic acid content after left standing was low, 2500 ppm or less, whereas the weight loss amounted to 1500 ppm or more. As compared with Example 3 in which the positive electrode was heated at 300° C. for 16 hours, in Comparative Example 7, the rate of increase in the weight loss was much higher than that in the carbonic acid content. Moreover, in Comparative Example 7, although the cycle characteristics showed no significant deterioration, the amount of battery swelling was great. Therefore, this is presumably attributed to that the carbonic acid content was decreased by the heating for the first time, but lithium hydrogencarbonate in an unstable state was increased while the positive electrode was left standing. This indicates that for suppressing gas generation, it is important to reduce not only the carbonic acid content but also the lithium hydrogencarbonate content.

In Example 10 in which the positive electrode was further heated at 300° C. for 16 hours after left standing, the above weight loss was reduced again, and the battery swelling was suppressed. This is presumably because unstable lithium hydrogencarbonate which had been increased while the positive electrode had been left standing was removed by further heating.

In Example 11 in which a carbonic acid ester and a sulfur compound were used as an additive, the capacity retention rate was further improved, and the battery swelling was significantly suppressed.

In Comparative Examples 8 and 9, the influence of water or carbonic acid gas was evaluated. In these batteries, the carbonic acid content and the weight loss were significantly increased, the cycle characteristics were deteriorated, and the batteries swelled remarkably during storage at high temperatures. Even compared with Comparative Example 1 in which, likewise, heating of the positive electrode was not performed, the carbonic acid content and the weight loss were increased. Therefore, these increases are considered to be attributed to an intentional addition of water or carbonic acid gas. The batteries swelled remarkably in these Comparative Examples presumably because lithium hydrogencarbonate was increased in the positive electrode, and in association with this, gas was generated to cause the batteries to swell remarkable. The cycle characteristics were deteriorated presumably because a large amount of gas was generated, and gas entered between the electrode plates in the electrode group, inhibiting the migration of lithium ions, to cause the capacity to decrease. In Comparative Example 8, in addition to the above reasons, the surface of the positive electrode active material was damaged by stirring in pure water, which also was considered to be responsible for the deterioration in cycle characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The non-aqueous electrolyte secondary battery of the present invention is useful as a main power source for electronic devices and the like. For example, it is can be suitably used as a main power source for mobile tools for consumer use, such as cellular phones and notebook personal computers, a main power source for power tools such as electric screwdrivers, and a power source for industrial use, such as for electric vehicles.

REFERENCE SIGNS LIST

10 Lithium ion secondary battery
11 Electrode group
12 Battery case
13 Positive electrode lead
14 Negative electrode lead
15 Insulator
16 Sealing plate
17 Negative electrode terminal
18 Insulation gasket
19 Sealing stopper
20 Explosion prevention valve

The invention claimed is:

1. A non-aqueous electrolyte secondary battery comprising: a positive electrode including a lithium-containing transition metal composite oxide as a positive electrode active material, a negative electrode including a negative electrode active material, a separator interposed between the positive electrode and the negative electrode, and a non-aqueous electrolyte, wherein
the positive electrode contains lithium carbonate and lithium hydrogencarbonate in a total amount of 500 ppm or more and 3000 ppm or less, and exhibits a weight loss by temperature increase from 25° C. to 300° C. at 5° C./min of 70% or less of the total amount and of 1500 ppm or less.

2. The non-aqueous electrolyte secondary battery according to claim 1, wherein the total amount of lithium carbonate and lithium hydrogencarbonate in the positive electrode is 1000 ppm or more and 2600 ppm or less, and the weight loss is 300 ppm or more and 1500 ppm or less.

3. The non-aqueous electrolyte secondary battery according to claim 1, wherein the lithium-containing transition metal composite oxide is represented by the formula (1):

$$Li_xNi_yM_{1-y}O_2 \quad (1)$$

where M is at least one element selected from the group consisting of Co, Mn, Cr, Fe, Mg, Ti, and Al; $0.95 \leq x \leq 1.1$; and $0.3 \leq y \leq 1$.

4. The non-aqueous electrolyte secondary battery according to claim 3, wherein in the formula (1), M at least contains Co and at least one selected from the group consisting of Mn and Al.

5. The non-aqueous electrolyte secondary battery according to claim 1, wherein
the non-aqueous electrolyte includes a non-aqueous solvent and a lithium salt,
the non-aqueous solvent contains a cyclic carbonate and a chain carbonate,
the cyclic carbonate is at least one alkylene carbonate selected from the group consisting of ethylene carbonate, propylene carbonate, and butylene carbonate.

6. The non-aqueous electrolyte secondary battery according to claim 5, wherein the chain carbonate is at least one dialkyl carbonate selected from the group consisting of dimethyl carbonate, diethyl carbonate, ethyl methyl carbonate, din-propyl carbonate, methyl n-propyl carbonate, ethyl n-propyl carbonate, methyl i-propyl carbonate, and ethyl i-propyl carbonate.

7. The non-aqueous electrolyte secondary battery according to claim 6, wherein the chain carbonate contains diethyl carbonate and ethyl methyl carbonate in a volume ratio of 25:75 to 75:25.

8. The non-aqueous electrolyte secondary battery according to claim 5, wherein the non-aqueous electrolyte further contains as an additive, at least one selected from the group consisting of a sulfur compound, and a carbonic acid ester different from the cyclic carbonate and the chain carbonate.

9. The non-aqueous electrolyte secondary battery according to claim 8, wherein the carbonic acid ester is at least one selected from the group consisting of an unsaturated cyclic carbonate, an alkylene carbonate having a substituent, an aromatic ring-condensed cyclic carbonate, a diaryl carbonate, and a dialkyl dicarbonate.

10. The non-aqueous electrolyte secondary battery according to claim 8, wherein the sulfur compound is at least one selected from the group consisting of sulfite, trithiocarbonate, sulfolane, sulfolene, sultone, and substituted products thereof.

* * * * *